United States Patent
Hinz

(10) Patent No.: US 9,395,822 B2
(45) Date of Patent: Jul. 19, 2016

(54) KEYCAP INCLUDING A LIQUID CRYSTAL PANEL AND POLARIZING GLYPHS

(71) Applicant: Peter Hinz, Munich (DE)

(72) Inventor: Peter Hinz, Munich (DE)

(*) Notice: Subject to any disclaimer, the term of this patent is extended or adjusted under 35 U.S.C. 154(b) by 8 days.

(21) Appl. No.: 14/578,521

(22) Filed: Dec. 22, 2014

(65) Prior Publication Data

US 2015/0248173 A1    Sep. 3, 2015

Related U.S. Application Data

(60) Provisional application No. 61/946,969, filed on Mar. 3, 2014.

(51) Int. Cl.
| | | |
|---|---|---|
| *G02F 1/1333* | (2006.01) | |
| *G06F 3/02* | (2006.01) | |
| *G02F 1/139* | (2006.01) | |
| *G06F 3/023* | (2006.01) | |
| *H01H 9/18* | (2006.01) | |

(52) U.S. Cl.
CPC ............ *G06F 3/0202* (2013.01); *G02F 1/1396* (2013.01); *G06F 3/0238* (2013.01); *H01H 9/181* (2013.01)

(58) Field of Classification Search
CPC ............... H01R 43/26; H01R 13/5213; Y10T 29/53274; Y10T 29/49117
See application file for complete search history.

(56) References Cited

U.S. PATENT DOCUMENTS

| | | |
|---|---|---|
| 4,441,001 A | 4/1984 | Miyano et al. |
| 4,617,461 A | 10/1986 | Subbarao et al. |
| 4,700,025 A | 10/1987 | Hatayama et al. |
| 4,987,279 A | 1/1991 | Hirose et al. |
| 5,034,602 A | 7/1991 | Garcia et al. |
| 5,181,029 A | 1/1993 | Kim |
| 5,266,949 A | 11/1993 | Rossi |
| 5,659,378 A | 8/1997 | Gessel |
| 5,708,428 A | 1/1998 | Phillips |
| 5,818,361 A | 10/1998 | Acevedo |
| 5,950,809 A | 9/1999 | Andre |
| 6,036,326 A | 3/2000 | Yoshikawa et al. |
| 6,217,183 B1 | 4/2001 | Shipman |
| 6,281,812 B1 | 8/2001 | Kim |
| 6,590,508 B1 | 7/2003 | Howell |
| 6,704,004 B1 | 3/2004 | Kaikuranta et al. |
| 7,301,532 B1 | 11/2007 | Dobry |
| 8,466,383 B2 | 6/2013 | Cheng et al. |

(Continued)

FOREIGN PATENT DOCUMENTS

| | | | |
|---|---|---|---|
| GB | 2496667 A | 5/2013 | |
| JP | 4547644 | * 9/2010 | ............... G02B 5/02 |

*Primary Examiner* — Donald Raleigh
(74) *Attorney, Agent, or Firm* — Smartpat PLC

(57) ABSTRACT

A keycap provides glyphs that are selectively visible. An exemplary keycap comprises a housing that has an at least partially transparent top side. A glyph made of a polarizing material is placed on the top side of the keycap. The glyph has a first plane of polarization. A liquid crystal panel is disposed inside the housing underneath the glyph. The liquid crystal panel is larger than the glyph above it. A polarizing filter having a second plane of polarization is arranged between the liquid crystal panel and a reflective carrier plate. Light enters the keycap through the transparent top side and is reflected at the bottom of the keycap by the reflective carrier plate. The reflected light is polarized by the polarization filter. The polarized light passes through the liquid crystal panel, which selectively rotates the polarization plane of light passing through it if the liquid crystal panel is active.

14 Claims, 3 Drawing Sheets

(56) References Cited

U.S. PATENT DOCUMENTS

| | | |
|---|---|---|
| 2002/0149568 A1 | 10/2002 | Kim |
| 2003/0058223 A1 | 3/2003 | Tracy et al. |
| 2003/0122691 A1 | 7/2003 | Olodort et al. |
| 2005/0056531 A1 | 3/2005 | Yu et al. |
| 2005/0090288 A1 | 4/2005 | Stohr et al. |
| 2005/0110762 A1 | 5/2005 | Muyskens et al. |
| 2005/0168421 A1 | 8/2005 | Hirose et al. |
| 2006/0158353 A1 | 7/2006 | Tseng |
| 2006/0179088 A1 | 8/2006 | Kang |
| 2006/0258387 A1 | 11/2006 | Komagata |
| 2007/0171503 A1 | 7/2007 | Luo |
| 2008/0030644 A1* | 2/2008 | Ukawa .............. G02F 1/133536 349/61 |
| 2009/0107817 A1 | 4/2009 | Onuki et al. |
| 2009/0283393 A1 | 11/2009 | Chen et al. |
| 2010/0052880 A1 | 3/2010 | Laitinen et al. |
| 2010/0073756 A1* | 3/2010 | Moskovits ........... G02B 5/3058 359/290 |
| 2010/0214228 A1 | 8/2010 | Sailer et al. |
| 2011/0048909 A1 | 3/2011 | Clark et al. |
| 2011/0127149 A1 | 6/2011 | Sun |
| 2012/0032820 A1 | 2/2012 | Lin |
| 2012/0097511 A1 | 4/2012 | Liu |
| 2012/0163028 A1 | 6/2012 | Chung et al. |
| 2012/0307479 A1 | 12/2012 | Toh |
| 2013/0088670 A1 | 4/2013 | Lu et al. |
| 2013/0148058 A1* | 6/2013 | Zhu ..................... G02B 6/0091 349/65 |
| 2013/0161170 A1 | 6/2013 | Fan et al. |
| 2013/0306455 A1 | 11/2013 | Wang et al. |
| 2014/0092022 A1 | 4/2014 | Chao |
| 2014/0118264 A1 | 5/2014 | Leong et al. |

* cited by examiner

KEYCAP INCLUDING A LIQUID CRYSTAL PANEL AND POLARIZING GLYPHS

TECHNICAL FIELD

The present disclosure relates to the field of input devices such as keyboards or keypads. More particularly, a keycap incorporating a liquid crystal panel and polarizing glyphs and a method for selectively displaying a glyph on a keycap are provided.

BACKGROUND

Electronic devices, such as desktop computers, laptops, netbooks, and tablets, typically include one or more user input mechanisms that facilitate interaction between a user and the electronic device. Such user input mechanisms include keyboards, mice, joysticks, and the like. Keyboards conventionally include an array of keys that are formed from stacked or layered components. Each key comprises a keycap which can be depressed by the user. A key may be associated with more than one function and thus the keycap may be labeled with more than one glyph such as a character or a symbol.

Keycaps with an integrated display are generally known and are typically based on a reflective twisted nematic liquid crystal display (LCD). Known liquid crystal displays use a glass substrate with ITO electrodes that is arranged between two polarizing filters. The shapes of the electrodes determine the shapes that will appear when the LCD is turned ON. Consequently, each keycap in a keyboard requires an LCD device with an individual electrode designed specifically for the glyphs to be shown.

SUMMARY

Keycaps labeled with glyphs that are selectively visible are disclosed. An exemplary keycap for an input device such as a keyboard comprises a housing that has an at least partially transparent top side. A glyph, for example a character or a symbol, made of a polarizing material is placed on the top side of the keycap. The glyph has a first plane of polarization. A liquid crystal panel is disposed inside the housing underneath the glyph. The liquid crystal panel is larger than the glyph above it. A polarizing filter having a second plane of polarization is arranged between the liquid crystal panel and a reflective surface, which may be a carrier plate. The second plane of polarization may be perpendicular to the first plane of polarization of the glyph, making the glyph appear normally dark (visible) when the liquid crystal panel is not activated. Alternatively the second plane of polarization may be parallel to the first plane of polarization of the glyph, making the glyph appear normally light (invisible) when the liquid crystal panel is not activated Light enters the keycap through the transparent top side and is reflected at the bottom of the keycap by the reflective carrier plate. The reflected light is polarized by the polarization filter. The polarized light passes through the liquid crystal panel, which selectively rotates the polarization plane of light passing through it if the liquid crystal panel is active. When active, i.e. when a voltage is applied, the liquid crystal panel selectively rotates the polarization plane of light in an area that is larger than the glyph above it.

In a "normally dark" arrangement the polarization plane of the glyph is perpendicular to the polarization plane of the polarization filter. For example, the polarization filter may be x-polarized and the glyph may be y-polarized. X-polarized light that passes through the inactive liquid crystal panel is absorbed by the y-polarized glyph, making the glyph appear dark relative to the keycap around it. The user thus sees a dark glyph with good contrast against the visible reflective carrier plate. When active, the liquid crystal panel rotates the polarization plane of the reflected polarized light, aligning it with the polarization plane of the glyph. The glyph becomes invisible, as the reflected light passes through the glyph just like it passes through the non-polarized top of the keycap around it.

The keycap allows a label such as a glyph to selectively appear or disappear. The presented keycap is based on a liquid crystal panel with a uniform design, i.e. the same liquid crystal panel can be used for every keycap. The diversity in showing individual information, i.e. different glyphs, on each keycap is provided by polarizing character and/or symbol members that are attached to the keycap housing, preferably to the keycap housing top side. To allow for customization each glyph, i.e. each character and/or symbol member, may be easily removed or replaced.

In the present keycap the liquid crystal panel rotates the polarization plane of light over a wide, typically rectangular, area. The visible glyph is determined by the shapes of the character and/or symbol members that are made from polarizing material. The character and/or symbol members are coupled to the keycap housing, preferably to the transparent top side of the housing by a transparent sheet or film. The character and/or symbol members may be removable. The liquid crystal panel generally comprises a first and a second glass or transparent plastic substrate, situated one opposite the other. A transparent conductive layer is deposited on each of the two glass or plastic substrates. One of the transparent conductive layers may be divided into two or more partitions. Each partition can be selectively activated to rotate the polarization plane of light passing through it. The other transparent conductive layer generally represents a common electrode. A liquid crystal layer is sandwiched between the two transparent conductive layers. A sheet of polarizing material is attached on the liquid crystal panel bottom side.

A lit surface is arranged at the bottom of the keycap. The lit surface may be reflective and reflect ambient light that enters the keycap from above. Alternatively, a light source may be provided inside the keycap to shine light onto the lit surface. The lit surface may be (semi) transparent and backlit from below. The lit surface may also be a light guide that is operatively connected to a light source.

The liquid crystal panel may be identical for each keycap of an input device. The realization of keycap diversity can be postponed to a post-final assembly process. A keyboard can cost-efficiently be adapted for example for use in different languages simply by replacing the transparent sheets which includes the polarizing character and symbol members. A keycap may show alternative glyphs that can be selectively displayed and provide for a final user to selectively display two alternative keyboard language layouts. A keyboard based on the disclosed keycaps may for example be selectively labeled as a "QWERTY" keyboard when writing in English and "QWERTZ" keyboard when writing in German.

A method for selectively displaying a glyph on a keycap comprises:
  providing a lit surface at a bottom of the keycap;
  providing a glyph made of polarizing material;
  polarizing light that emanates from the lit surface;
  selectively rotating the polarization plane of the polarized light; and
  backlighting the glyph by the selectively rotated polarized light.

The lit surface may be reflecting ambient light that enters the keycap through a transparent top. It may also be actively lit by a light source inside the keycap. Selective rotation of the light is affected by a liquid crystal panel.

DETAILED DESCRIPTION

Figure 1:
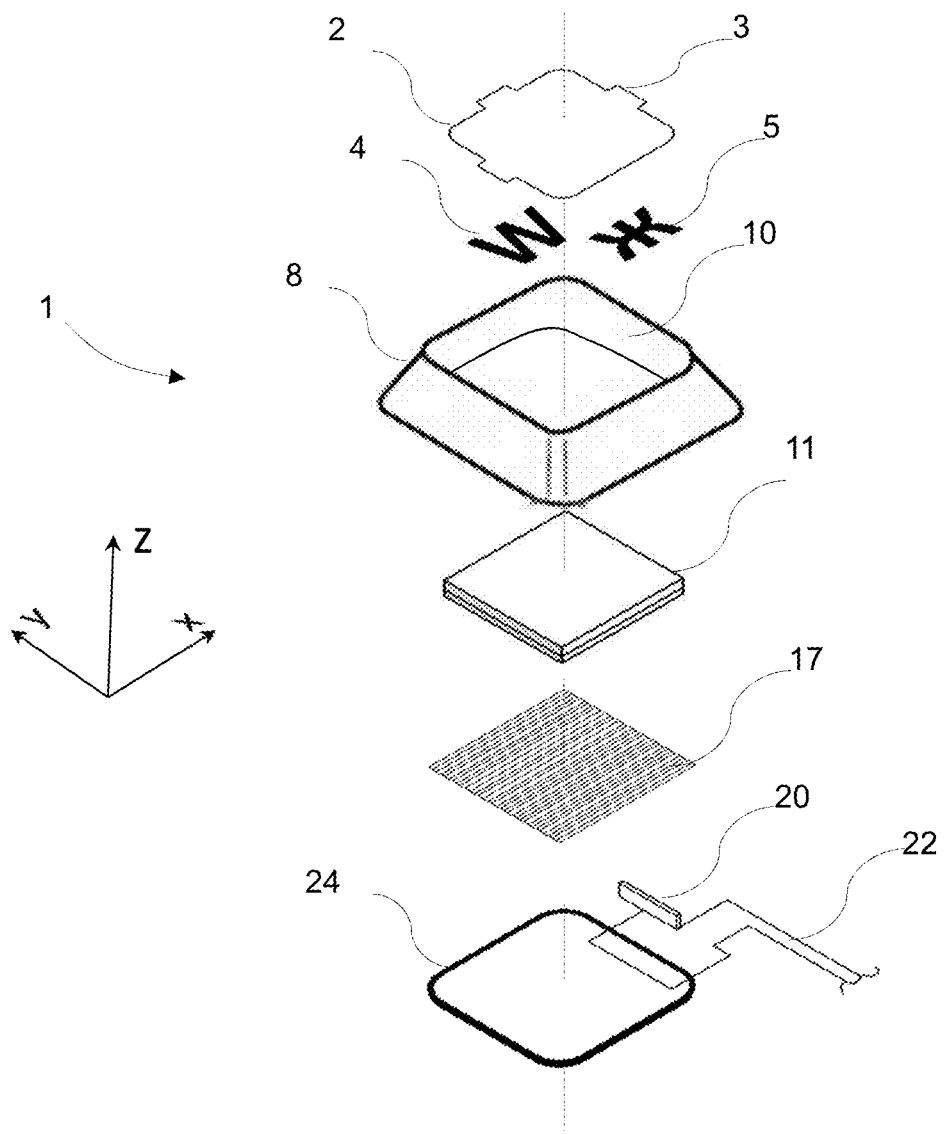
FIG. 1 is exploded view of a keycap including a liquid crystal panel and polarizing glyphs.

FIG. 1 shows an exploded perspective view of a keycap 1 with a liquid crystal panel 11 and polarizing glyphs 4,5. The keycap 1 includes a housing 8, the top side 10 of which is transparent and allows light pass through. The orientation of the top side 10 of the housing will be referred to as the XY plane. A carrier plate 24 is arranged at the bottom of the keycap. Polarizing glyphs 4,5 such as a character member 4 or a symbol member 5 may be disposed on the transparent top side 10 of the housing 8. In particular, the polarizing glyphs 4,5 may be incorporated into a transparent sheet 2, which provides fixation, mounting, and protection for the glyphs 4,5. The transparent sheet 2 is not polarizing and may comprise an adhesive for attaching the transparent sheet 2 to the top side 10 of the housing 8. Only the glyphs 4,5 attached to the transparent sheet 2 are made of polarizing material. The polarizing material is generally a polyvinyl alcohol (PVA) polymer impregnated with iodine or a dichronic dye-type film. Polarizing film is made by dyeing film (mainly polyvinyl alcohol (PVA)) or by iodine being adsorbed onto its surface, then stretching and orientating it.

The transparent sheet 2 may be detachable from the keycap 1. In particular, the transparent sheet 2 may have one or more alignment and attachment features 3 to support the mechanical fixation of the transparent sheet 2 on the top side 10 of the housing 8. The alignment and attachment feature 3 may be one or more tabs which releasably connect the transparent sheet 2 to corresponding grooves in the housing 8.

A liquid crystal panel 11 is disposed inside the housing 8 underneath and generally parallel to the glyphs 4,5 in an XY plane. The liquid crystal panel 11 is configured to selectively rotate the polarization plane of light passing through it. A polarization filter 17 is arranged between the liquid crystal panel 11 and the carrier plate 24. The liquid crystal panel 11 may be an electrically controlled twisted nematic device which rotates the polarization of light as it passes through the liquid crystal layer thereof if a sufficiently large voltage is applied to the panel 11. The liquid crystal panel 11 may be connected to a flexible printed cable 22 via an elastomeric interconnection member 20. The elastomeric interconnection member 20 may be sandwiched between electrical contacts of the liquid crystal panel 11 and electrical contacts of flexible circuit cable 22. The liquid crystal panel 11 is preferably electrically connected to an external circuitry for preferably static driving.

The carrier plate 24 is firmly attached at the bottom of the housing 8 and holds the components within the keycap 1 together. The carrier plate 24 may be glued to, laser welded to, or mechanically connected to the housing 8 by a press-fit or clipping connection. The upper surface of the carrier plate 24 is lit. In particular, the upper surface of the carrier plate 24 may be reflective such that ambient light that enters the keycap 1 through the transparent top side 10 of the housing 8 is reflected by the carrier plate 24.

In a "normally dark" embodiment the polarizing glyphs 4,5 appear dark (visible) when the liquid crystal panel 11 is not activated, and appear light (become invisible), when the liquid crystal panel 11 is activated. This is achieved by arranging the polarization plane of the polarization filter 17 perpendicular to the polarization plane of the polarizing glyphs 4,5. For example, the polarization filter 17 may be arranged such that light passing through it is generally polarized in the XZ plane. The polarizing glyphs 4,5 may have an YZ polarization plane. Exterior light entering the keycap 1 through the transparent top side 10 passes through the polarization filter 17 to reach the reflective carrier plate 24. The carrier plate 24 reflects the light back, which passes a second time through the polarization filter 17. At this point, the light is polarized in the XZ plane, i.e. x-polarized. If the liquid crystal panel 11 is not activated, i.e. no voltage is applied thereto, light passes through the liquid crystal panel 11 without changing its polarization plane. The x-polarized light backlights the glyph 4,5 where it is absorbed, since the glyph 4,5 is translucent only for y-polarized light. The surface around the glyph appears light, since it is non-polarized and transparent.

If the liquid crystal panel 11 is activated, i.e. a sufficiently large voltage is applied thereto, light passing through the liquid crystal panel 11 changes its polarization plane from being x-polarized to being y-polarized. The now y-polarized light passes through the glyph 4,5 since glyph 4,5 is translucent for y-polarized light. The glyph 4,5 becomes practically invisible, having the same light appearance as the surface around it.

In a "normally light" embodiment the polarizing glyphs 4',5' appear dark (visible) when the liquid crystal panel 11 is activated, and appear light (invisible), when the liquid crystal panel 11 is not activated. This is achieved by arranging the polarization plane of the polarization filter 17 parallel to the polarization plane of the polarizing glyphs 4',5'. For example, the polarization filter 17 may be arranged such that light passing through it is generally polarized in the XZ plane. The polarizing glyphs 4',5' also have an XZ polarization plane. Exterior light entering the keycap 1 through the transparent top side 10 passes through the polarization filter 17 to reach the reflective carrier plate 24. The carrier plate 24 reflects the light back, which passes a second time through the polarization filter 17. At this point, the light is polarized in the XZ plane, i.e. x-polarized. If the liquid crystal panel 11 is not activated, i.e. no voltage is applied thereto, light passes through the liquid crystal panel 11 without changing its polarization plane. The x-polarized light backlights and passes through the glyph 4',5'. The glyph 4',5' becomes practically invisible, having the same light appearance as the surface around it.

If the liquid crystal panel 11 is activated, i.e. a sufficiently large voltage is applied thereto, light passing through the liquid crystal panel 11 changes its polarization plane from being x-polarized to being y-polarized. The now y-polarized light is absorbed by the glyph 4',5', since the glyph 4',5' is translucent only for x-polarized light. The surface around the glyph appears light, since it is non-polarized and transparent.

The keycap 1 may be connected to a scissor switch mechanism (not shown) and configured to move upward and downward in the Z-direction. A plurality of keycaps 1 may be used within a keyboard.

As shown in FIG. 1 the polarizing glyphs 4,5 may be mounted on the top side 10 of the housing 8 of the keycap 1. Alternatively, the polarizing glyphs 4,5 may be arranged anywhere between the top side 10 of the housing 8 and the liquid crystal panel 11, and may for example be disposed on an upper surface of the liquid crystal panel 11 within the housing 8. In contrast to known liquid crystal displays there is no polarizing layer covering the entire surface area above the liquid crystal panel 11. Above the liquid crystal panel 11, only the glyphs 4,5 are made of polarizing material.

Figure 2:
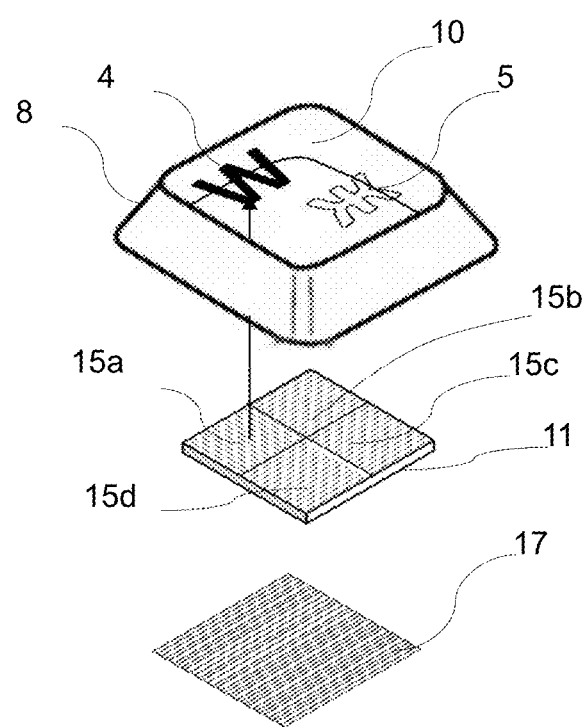
FIG. 2 illustrates portions of an alternative keycap having a partitioned liquid crystal panel.

In an alternative exemplary embodiment shown in FIG. 2 a polarizing character member 4 and a polarizing symbol member 5 are placed on the transparent top side 10 of the keycap housing 8. A segmented liquid crystal panel 11 is divided into four separate partitions 15a-d. Each partition 15a, 15b, 15c, 15d is separately controllable to selectively rotate the polarization plane of light passing through each partition 15a, 15b, 15c, 15d. The polarizing character member 4 and the polarizing symbol member 5 are aligned with the partitions 15a-d of the segmented liquid crystal panel 11 such that each glyph 4, 5 is associated with one partition of the segmented liquid crystal display. As shown, the character member 4 is associated with a first partition 15a of the segmented liquid crystal panel 11. The symbol member 5 is associated with a second partition 15c of the segmented liquid crystal panel 11. The character member 4 and the symbol member 5 are dimensioned such that their surfaces falls entirely within the surfaces of the respective partitions 15a, 15c of the segmented liquid crystal panel 11 below. More specifically, the maximum x- and y-extension of the character member 4 is smaller than the x- and y-extension of the associated and rectangular shaped partition 15a below. The maximum x- and y-extension of the symbol member 5 is smaller than the x- and y-extension of the associated and rectangular shaped partition 15c below.

Figure 3:
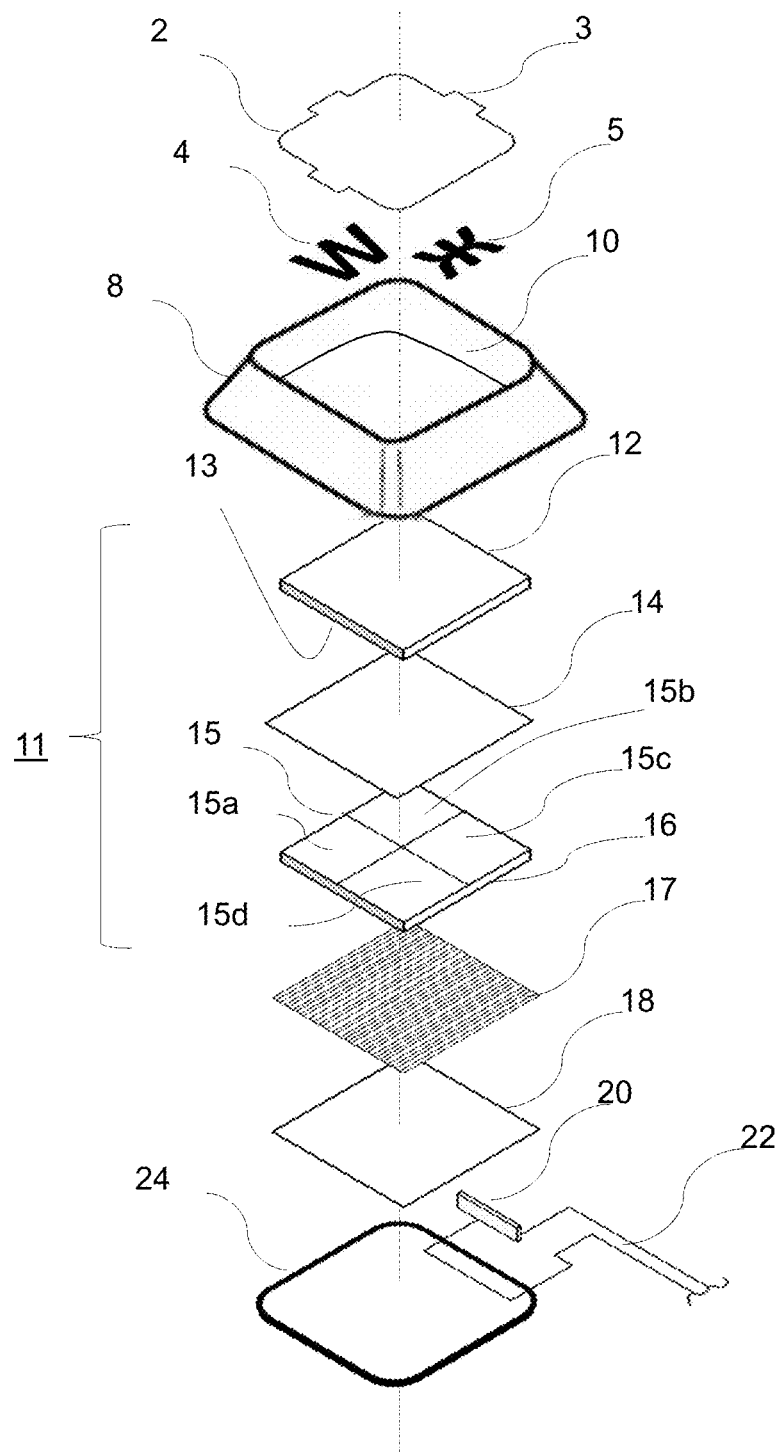
FIG. 3 is a detailed exploded view of a keycap with a partitioned liquid crystal panel and polarizing glyphs.

A more detailed view of the keycap 1 is provided in FIG. 3. The liquid crystal panel 11 generally comprises a first glass substrate 12 and a second glass substrate 16, situated opposite each other and arranged in parallel XY planes. Alternatively, the glass substrates 12 and 16 may be replaced by transparent plastic substrates. A first transparent conductive layer 13 is deposited on the first glass substrates 12. A second transparent conductive layer 15 is deposited on the second glass substrate 16. The second transparent conductive layer 15 is preferably divided into several partitions 15a-d. Each partition 15a, 15b, 15c, 15d can be selectively activated to rotate the polarization plane of light passing through it. The first transparent conductive layer 13 generally represents a common electrode. A liquid crystal layer 14 is sandwiched between the first transparent conductive layer 13 and the second transparent conductive layers 15. The conductive layers 13,15 may be made from Transparent Conductive Oxides (TCO) such as Indium Tin Oxide (ITO) that is deposited onto the glass or plastic substrate 12, 16.

Each partition 15a, 15b, 15c, 15d of the second transparent conductive layer 15 is preferably controlled by the static driving method, i.e. a constant voltage is applied to each partition 15a-d that is to be activated. The first transparent conductive layer 13 and the second transparent conductive layer 15, respectively each of its partitions 15a-d, are connected to a flexible printed cable 22 via an elastomeric interconnection member 20. Alternatively, the liquid crystal panel can be connected via hot seal to a flexible printed cable.

A sheet of polarizing material 17 is attached to the bottom of the liquid crystal panel 11. A reflective surface 18 may be disposed on top of the carrier plate 24 and reflect light that enters the keycap 1 through the transparent top side 10. Instead of using a reflective carrier plate 24 or a reflective surface 18 above the carrier plate 24 an active light source may be used within the keycap 1. In that case, carrier plate 24 may be transparent and backlit by a light source disposed below the carrier plate. In yet another embodiment the reflective surface 18 may be replaced by a light guide, which is actively illuminated by a light source.

The polarizing character member 4 and/or symbol member 5 are preferably incorporated into a transparent sheet 2. The transparent sheet 2, which includes the polarizing character member 4 and/or symbol member 5, is configured to be easily attachable and detachable to the keycap housing 8. Outside of the polarizing character member 4 and/or the polarizing symbol member 5 the transparent sheet is not polarizing.

The liquid crystal panel 11 may be flipped such that the common first common transparent conductive layer 13 is below the segmented second second transparent conductive layer 15. The liquid crystal panel 11 may be attached to the housing 8 or it may be attached to the carrier plate 24.

Those skilled in the art will appreciate that the housing 8 and/or the transparent sheet 2 can assume may different shapes and sizes. The housing 8 may for example be made of only semi-transparent material or comprise a cut-out within its top side 10.

While the present invention has been described with reference to exemplary embodiments, it will be readily apparent to those skilled in the art that the invention is not limited to the disclosed or illustrated embodiments but, on the contrary, is intended to cover numerous other modifications, substitutions, variations and broad equivalent arrangements that are included within the spirit and scope of the following claims.

What is claimed is:

1. A keycap for an input device, comprising:
a housing having an at least partially transparent top side;
two or more glyphs made of a polarizing material having a first plane of polarization;
a carrier plate disposed at a bottom of the housing opposite the top side;
a liquid crystal panel disposed inside the housing underneath the two or more glyphs, the liquid crystal panel comprising two or more partitions which are aligned with the two or more glyphs; and
a polarizing filter disposed between the liquid crystal panel and the carrier plate, the polarizing filter having a second plane of polarization,
wherein the two or more partitions of the liquid crystal panel are independently controlled and configured to selectively rotate the polarization plane of light passing from the carrier plate through the two or more partitions of the liquid crystal panel to the top side of the housing, and
wherein each of the two or more glyphs appears light or dark in response to the selective rotation of the polarization plane of light passing through each of the two or more partitions of the liquid crystal panel.

2. The keycap as in claim 1, wherein the carrier plate is reflective and illuminated by light which enters the keycap through the at least partially transparent top side.

3. The keycap as in claim 1, wherein the carrier plate is at least partially transparent and illuminated by a light source which is arranged below the carrier plate.

4. The keycap as in claim 1, wherein the two or more glyphs are smaller than the liquid crystal panel underneath it.

5. The keycap as in claim 1, wherein the first plane of polarization is perpendicular to the second plane of polarization, thereby causing the two or more glyphs to appear normally dark when the liquid crystal panel is not active.

6. The keycap as in claim 1, wherein the first plane of polarization is parallel to the second plane of polarization, thereby causing the two or more glyphs to appear normally light when the liquid crystal panel is not active.

7. The keycap as in claim 1, wherein each of the two or more glyphs is smaller than the respective partition of the liquid crystal panel underneath it.

8. The keycap as in claim 1 wherein the two or more glyphs are made of an adhesive film disposed on the top side of the housing.

9. The keycap as in claim 8 wherein adhesive film comprises an alignment feature to align the two or more glyphs with the top side of the housing.

10. The keycap as in claim 1 wherein the two or more glyphs are made of an adhesive film disposed on the liquid crystal panel.

11. A keyboard comprising a plurality of keycaps as in claim 1.

12. A method for selectively displaying a glyph on a keycap, comprising:
- providing a lit surface at a bottom of the keycap;
- providing a glyph made of polarizing material;
- polarizing light that emanates from the lit surface;
- selectively rotating the polarization plane of the polarized light by applying a voltage to a liquid crystal panel; and
- backlighting the glyph by the selectively rotated polarized light.

13. The method as in claim 12, wherein the lit surface reflects ambient light.

14. The method as in claim 12, further comprising:
- providing a light source inside the keycap; and
- shining light from the light source onto the lit surface.

* * * * *